US009466197B2

(12) United States Patent
Hildick-Pytte (10) Patent No.: US 9,466,197 B2
(45) Date of Patent: Oct. 11, 2016

(54) EMERGENCY SERVICES SYSTEM AND METHOD COMPRISING A MESH COMMUNICATIONS NETWORK, A PLURALITY OF COMMUNICATION NODES, AND A PLURALITY OF PERSONAL TAGS

(71) Applicant: Margaret Hildick-Pytte, Mosman Park (AU)

(72) Inventor: Margaret Hildick-Pytte, Mosman Park (AU)

( * ) Notice: Subject to any disclaimer, the term of this patent is extended or adjusted under 35 U.S.C. 154(b) by 293 days.

(21) Appl. No.: 14/200,912

(22) Filed: Mar. 7, 2014

(65) Prior Publication Data

US 2014/0292509 A1 Oct. 2, 2014

Related U.S. Application Data

(63) Continuation of application No. PCT/AU2012/001065, filed on Sep. 7, 2012.

(30) Foreign Application Priority Data

Sep. 9, 2011 (AU) .................... 2011903681

(51) Int. Cl.

| G08B 21/00 | (2006.01) |
|---|---|
| G08B 21/02 | (2006.01) |
| G08B 25/00 | (2006.01) |
| G08B 25/01 | (2006.01) |
| G06Q 50/06 | (2012.01) |
| G06Q 90/00 | (2006.01) |
| G06Q 50/26 | (2012.01) |
| G06K 17/00 | (2006.01) |
| G08B 7/06 | (2006.01) |

(52) U.S. Cl.
CPC ............. *G08B 21/02* (2013.01); *G06Q 50/06* (2013.01); *G06Q 50/265* (2013.01); *G06Q 90/20* (2013.01); *G08B 25/009* (2013.01);

(Continued)

(58) Field of Classification Search
CPC .............. G06K 2017/0045; G01S 13/878; G08B 21/02; G08B 21/0272; G08B 25/016
USPC ..................................... 340/539.13
See application file for complete search history.

(56) References Cited

U.S. PATENT DOCUMENTS 7,737,850 B2 6/2010 Malik
2005/0048987 A1* 3/2005 Glass ............... H04M 1/72544
455/456.1

(Continued)

FOREIGN PATENT DOCUMENTS

WO WO2006007041 A1 1/2006
WO WO2009118762 A1 10/2009

OTHER PUBLICATIONS

International Search Report for International Application PCT/AU2012/001065, mailed Nov. 30, 2012.

(Continued)

*Primary Examiner* — Mark Rushing
(74) *Attorney, Agent, or Firm* — Fish & Richardson P.C.

(57) ABSTRACT

An emergency services system ("ESS") for a worksite is constituted by a number of tags, a mesh network, and a management system. Each person on the worksite is provided with a tag. Each tag when activated and logged onto the ESS uniquely identifies the person carrying that tag. The mesh network comprises a number of nodes and is arranged to provide communication over the entirety of the worksite. The nodes communicate with active tags. The management system receives and processes position data of active tags from the nodes via the communications network. The management system includes one or more displays arranged to display information pertaining to a worksite, its personnel and status. The ESS relies on use of signal strength in the mesh communication network to provide one source of location information. The observed signal strength received to multiple nodes is used to triangulate the position of a tag.

35 Claims, 5 Drawing Sheets

(52) U.S. Cl.
CPC ... *G08B 25/016* (2013.01); *G06K 2017/0045* (2013.01); *G08B 7/062* (2013.01)

(56) References Cited

U.S. PATENT DOCUMENTS

| | | | | |
|---|---|---|---|---|
| 2009/0091450 A1* | 4/2009 | Deavila | ............... | G01S 5/0018 340/572.1 |
| 2010/0060452 A1* | 3/2010 | Schuster | ............ | G08B 13/2402 340/572.1 |
| 2011/0205033 A1* | 8/2011 | Bandyopadhyay | ... | G01S 5/0289 340/10.51 |
| 2013/0157713 A1* | 6/2013 | Stolarczyk | ............ | H04M 1/026 455/550.1 |

OTHER PUBLICATIONS

International Preliminary Report on Patentability for International Application No. PCT/AU2012/001065, mailed Mar. 14, 2013.

\* cited by examiner

EMERGENCY SERVICES SYSTEM AND METHOD COMPRISING A MESH COMMUNICATIONS NETWORK, A PLURALITY OF COMMUNICATION NODES, AND A PLURALITY OF PERSONAL TAGS

FIELD OF THE INVENTION

The present invention relates to an emergency service system for a worksite such as, but not limited to, an off shore oil/gas platform or oil/gas drilling rig; an industrial complex such as a refinery or nuclear power stations; or a mine site.

BACKGROUND OF THE INVENTION

In an emergency or disaster situation in worksite it is critical to locate people and quarantine damaged areas. There are many current systems that in an ideal situation are able to determine the location of people. For example current GPS and mobile phone technology are able to provide a location indication of a person. However such technologies are not always appropriate or sufficient in themselves to provide location information in worksite emergency surveillance. For example GPS and mobile phone technology rely on relatively unobstructed access to satellites and phone towers. Many worksites comprise large amounts of metal, concrete and/or earth; or are simply too deep: within other structures, underground or underwater, for conventional technology to reliably provide location information.

The present invention was developed with the view to providing an emergency services system that may assist in locating personal and enable critical decisions making in emergency situations.

SUMMARY OF THE INVENTION

In one form the present invention provides an emergency services system to provide enhanced safety for personnel in a worksite. In a broad sense, embodiments of the present invention may comprise in combination a plurality of electronic tags each able to uniquely identify an individual person; a mesh communications network comprising a plurality of communication nodes distributed to enable communication over the worksite where the nodes are also able to detect the position of active tags in the worksite, and a management system configured to receive and process position data of active tags via the mesh communications network.

In one aspect the invention provides an emergency services system for a worksite comprising:
  a mesh communications network comprising a plurality of communication nodes distributed to enable communication over the worksite;
  a plurality of personal tags, each personal tag configured to be carried by or on a person, the tags being switchable between: an active state in which the tag is recognised by one or more of the nodes and uniquely identifies using biometric recognition software, a person carrying the tag; and, inactive state where the tag is not recognised by node;
  the nodes enabled to communicate with active tags in the worksite and provide corresponding position data relating to the active tags; and
  a management system configured to receive and process the position data of the active tags from one or more of the nodes via the mesh communications network.

In one embodiment the emergency services system comprises one or more sensors capable of sensing physical characteristics in respective adjacent regions of the worksite, the sensors providing sensor data which is communicated by the mesh communications network to the management system.

In one embodiment the one or more sensors comprise one or more of: an air temperature sensor, an air pressure sensor, a gas sensor, a moisture sensor, a smoke sensor, a fire sensor, a motion sensor, and an infrared sensor.

In one embodiment the one or more of the sensors are incorporated in or integrated with one or more of the nodes.

In one embodiment the one or more of the nodes comprise or are integrated with an exit sign or an emergency lighting system.

In one embodiment the emergency services system is configured to detect presence of a person in the worksite without an active tag and, upon detection of such a person, raise an alarm.

In one embodiment the management system is arranged to correlate a tag with authorised and unauthorised areas of the worksite, and issue an alarm in the event that an active tag is detected in an unauthorised area.

In one embodiment the management system is arranged to correlate an active tag with a task or function of a person carrying the active tag that may be recognised and verified by biometric data.

In one embodiment the management system is arranged to raise an alarm in the event that active tags for two or more people with incompatible tasks or function are located within a prescribed separation distance.

In one embodiment one or more of the nodes is provided in an emergency escape vehicle of the worksite, the or each node in the emergency escape vehicle being configured to communicate with the management system either: via the mesh network; or, directly upon deployment of the vehicle.

In one embodiment when the management system is arranged to issue an alarm in the event of a loss of communication of a node in the network In one embodiment the emergency system is arranged to issue an alarm in the event of a loss of communication between an active tag and a node.

In one embodiment the mesh network comprises one or more dynamically positionable nodes capable of being positioned at a location in the worksite to supplement the mesh network.

In one embodiment at least one of the dynamically positional nodes is supported on a remote controlled robot.

In one embodiment at least one dynamically positionable node is supported on a remotely controlled flying machine.

In one embodiment the mesh network comprises a wireless communication network.

In one embodiment the mesh network is provided over power lines of the worksite.

In one embodiment the communications network comprises a combination of wireless and wired communications channels.

In one embodiment the management system comprises a three dimensional representation of the worksite enabled to provide real time indication of the location of each active tag and each node.

In one embodiment the emergency services system further comprises a recording system enable to record location data of active tags, people detected by the network without an active tag, and data detected by the sensors.

In one embodiment the management system is enabled to provide historical data pertaining to a last known location of a person prior to a user specified point in time.

In one embodiment each tags in the form of a portable electronic device is configured to uniquely identify a person associated with the device.

In one embodiment the tag is configured to be carried in a pocket of clothing of the person, or a pouch attachable to a belt or item of clothing of the person.

In one embodiment the tag is embedded in or carried by a safety helmet or shoe.

In one embodiment the tag is provided with or otherwise fixed to a clip wherein the clip is operable to clip onto a person's clothing or clothing accessory such as but not limited to a belt, tie, or braces.

In one embodiment one or more of the nodes is provided with either one or both of video surveillance equipment and audio surveillance equipment and arranged to communicate corresponding video and audio data via the mesh network to the management system.

In one embodiment the emergency services system is configured to determine location data of an activated tag on the basis of received wireless signal strength from the tag to a plurality of nodes.

In one embodiment the emergency services system comprises a biometric recognition system integrated with the management system and the tags to uniquely identify a person provided with an active tag.

In one embodiment the emergency services system comprises at least one duplicate management systems located remote from the management system and wherein the management system and the mesh network are each arranged to independently communicate the position data and sensor data to each of the at least one duplicate management system.

A second aspect of the invention provides a method of providing an emergency services system in a worksite comprising:
   establishing a multi-node mesh communications network over the worksite;
   providing one or more people in the worksite with respective tag, wherein each tag when activated uniquely identifies a corresponding single person;
   detecting the location of tags in the worksite and communicating the location via the mesh communications network to a management system;
   using the management system to monitor the location and movement of people in the worksite.

In one embodiment establishing the mesh communications network comprises using an existing communication system of the worksite to provide communication between: at least two nodes in the mesh communication network; or, between one of the nodes and the management system.

In one embodiment the method comprises sensing physical characteristics at one or more locations in the worksite and communicating sensed physical characteristics via the mesh communication network to the management system.

In one embodiment the method comprises embedding one or more nodes of the mesh communication network in a respective exit sign or emergency lighting system of the worksite.

In one embodiment the method comprises fixing the nodes of the mesh communication network to a wall or bulkhead of the worksite.

In one embodiment sensing physical characteristics comprises sensing one or more of air temperature, air pressure, the presence of one or more target gases, moisture, smoke, fire, motion, and infrared radiation.

A third aspect of the invention provides an emergency services system for a worksite comprising:
   a mesh communications network comprising a plurality of communication nodes distributed to enable communication over the worksite; a plurality of personal tags, each personal tag configured to be carried by or on a person, the tags being switchable between: an active state in which the tag is recognised by one or more of the nodes and uniquely identifies a person carrying the tag; and, inactive state where the tag is not recognised by node;
   the nodes enabled to communicate with active tags in the worksite and provide corresponding position data relating to the active tags; and
   a management system configured to receive and process the position data of the active tags from one or more of the nodes via the mesh communications network, and comprising a three dimensional representation of the worksite enabled to provide real time indication of the location of each active tag and each node within a prescribed distance of one meter or less.

A fourth aspect of the invention provides a method of providing an emergency services system in a worksite comprising:
   providing one or more people in the worksite with respective tag, wherein each tag when activated uniquely identifies a corresponding single person;
   detecting the location of tags in the worksite to a resolution of about one meter or less and communicating the location via a mesh communications network that facilities electronic communications on the worksite to a management system;
   using the management system to monitor the location and movement of people in the worksite.

DETAILED DESCRIPTION OF THE PREFERRED EMBODIMENTS

Embodiments of the present invention will now be described in the context of an offshore oil rig. However embodiments of the invention are not limited to application on such structures. Rather, as will be apparent to those of ordinary skill in the art embodiments of the present invention have application in other structures such as buildings, processing plants and underground mines.

Figure 1:
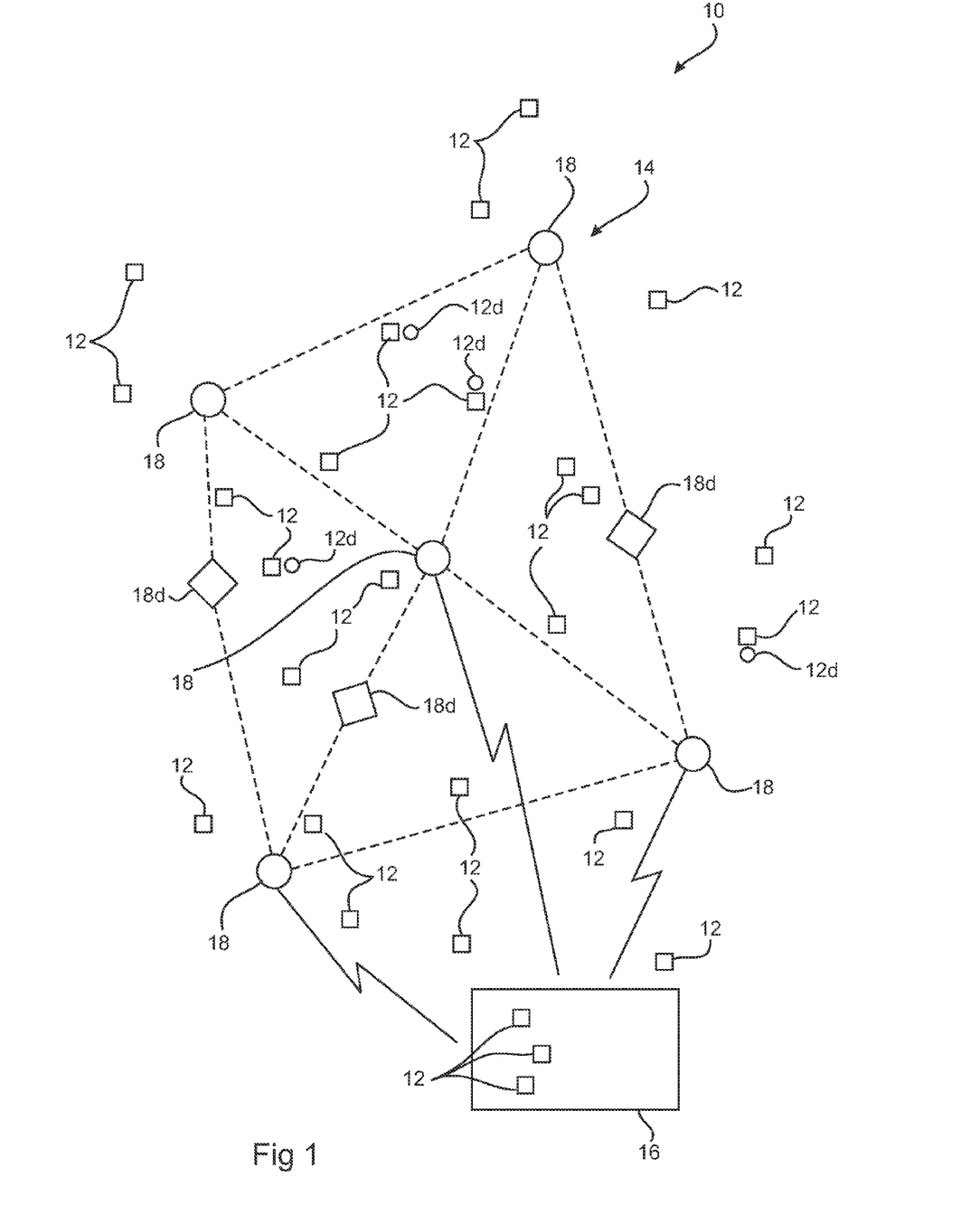
FIG. 1 is a block diagram representation of an embodiment of the an emergency services system in accordance with an aspect of the invention.

FIG. 1 illustrates very broadly an embodiment of the emergency services system 10 (hereinafter referred to "ESS 10"). The ESS 10 comprises a number of tags 12, and mesh network 14, and a management system 16. In brief, each person on the worksite is provided with a tag 12. Each tag 12 when activated and logged onto the ESS 10 uniquely identifies the person carrying that tag. To this end the ESS10 and tags 12 may use biometric recognition software to uniquely identify personnel. Example of such software include fingerprinting scanning software presently in use at airports or retina scanning software in operation in high security areas of government and/or military installations. The mesh network 14 comprises a number of nodes 18 and is arranged to provide communication over the entirety of the worksite. The nodes 18 communicate with active tags 12. The management system 16 receives and processes position data of active tags 12 from the nodes 18 via the communications network 14. The management system 16 includes one or more displays arranged to display information pertaining to a worksite, its personnel and status. The information may be displayed in numerous ways including but not limited to: 2D or 3D graphical representations and models of personnel and structures including section views, and x-ray or transparent views; real images in 2D or 3D; alpha-numerical data including text, graphs, and tables; and any combination thereof. Examples of the information displayed include: real-time location (and thus tracking) of the tags 12 on the worksite (shown for example in FIG. 2); sensed or detected data relating to the personnel on the worksite; and operational status of plant and equipment. It is envisaged that the management system 16 is co-located with a control centre for the worksite. However the, or an additional, duplicate management system 16 can be located remote from the worksite.

Figure 2:
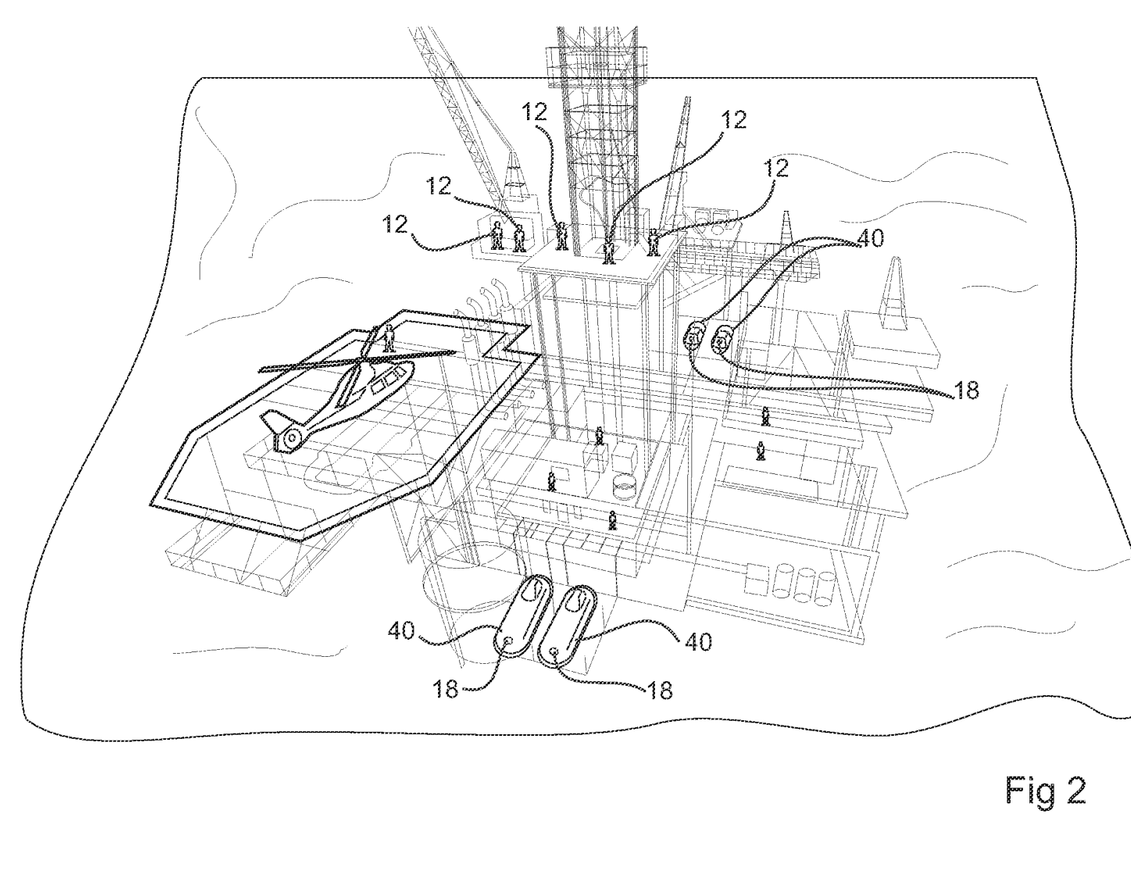
FIG. 2 is a representation of an image of a worksite in the form of an offshore oil rig on which may be displayed by a management system incorporated in embodiment of the emergency services system.
Figure 3:
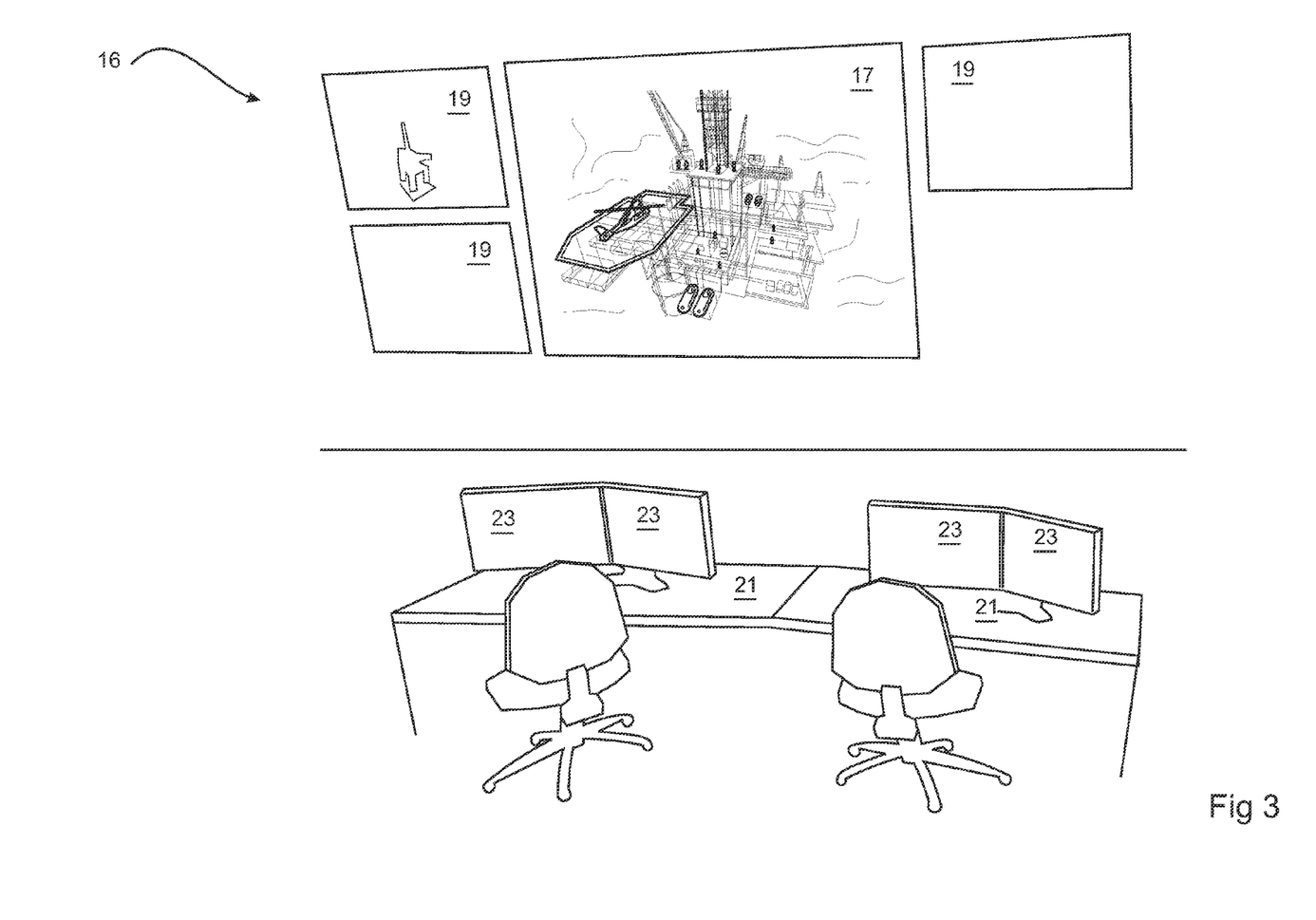
FIG. 3 is a representation of a management system incorporated in the emergency services system

FIG. 3 provides a representation of the management system 16. The management system 16 is or may be equated with a control centre having a banks of relatively large screen commonly viewable displays 17 (as shown in FIG. 2) and 19 providing switchable views of the worksite; and operator consoles 21. The consoles 21 are provided with dedicated display screens 23 and communications interfaces such as a keyboard, telephone and radio. The communications interfaces enable the operator to communicate with: worksite personnel on an individual, group, or a regional/area basis; or with offsite personnel or services.

Each tag 12 is in the form of an electronic device having at least a transmitter but preferably a transceiver to allow bi-directional communication of information with the network 14 and in particular, one or more of the nodes 18. Providing the tag 12 in the form of an electronic device also enables easy coding of the tag 12 to uniquely identify a person carrying a tag and logging into the ESS 10. As an example in one form, the tag 12 may comprise or at least include the substantive features of a mobile telephone in terms of the ability to transmit and received information and provide visual, audible and tactile communication. The tag 12 is housed in a rugged and preferably waterproof casing to provide protection commensurate with the nature of the worksite and work performed by persons carrying the tag 12. It is further envisaged that the tag 12 in addition to communicating location data may also be provided with the following features:

Push to talk communications for use within the worksite;
Mobile chat/Twitter® equivalent functionality for use within the worksite;
Telephone communication routed through the phone system of the worksite;
General purpose computing capability and optionally internet functionality;
Video camera support for recording or live sharing of worksite activities with remote viewers.

The tag 12 may be configured to be worn by or on a person. For example, tag 12 may be of a shape and configuration to sit within a pocket on a garment of clothing. Alternatively, a dedicated pouch may be provided for the tag 12 to provide additional physical protection and enable coupling to a belt or other item of clothing worn by the person. In yet a further variation, the tag 12 may be embedded in or attached to a safety helmet, or in or on a shoe or boot. In a further variation the tag may be provided with or otherwise fixed to a clip wherein the clip is operable to clip onto a person's clothing or clothing accessory such as but not limited to, a belt, tie, or braces.

The tag 12 can also be arranged to communicate life signs to the management system 16 such as one or more of: pulse rate, heart beat and electrocardiogram signal. This may be achieved by providing a sensor that is worn by a person and communicates with the tag. Such sensors are commonly available and used by athletes or persons during exercise to monitor heart rate.

The above described tags 12 may be considered as "smart" tags as they provide user functionality and two way communications and signalling. In addition or alternately the tag 12 may be "dumb" tags 12d. A dumb tag 12d can be either in the form of: transponder which and only transmits signs in response to being interrogated by an electronic device; or a transceiver that that issue a very limited range of signals such as an "emergency" signal and/or a "location" signal. The dumb tag 12d does not ordinarily have or need an onboard power supply. A person can be provided with both a smart tag 12 and a dumb tag 12d to provide a degree or redundancy. Throughout this description the term "tag 12" is used and to be understood in a generic sense to include smart or dumb tags unless the context of use implies otherwise.

As previously described, mesh network 14 comprises a number of nodes 18. Each node is arranged to act as an independent router. This enables the communications network to re-configure itself in the event of a node 18 being disabled for example due to catastrophic event or loss of power. In such circumstances, the remaining nodes 18 automatically reconfigure communication paths within the network 14 ensuring end-to-end communication between tags 12 and the management system 16 via the network 14.

The nodes 18 may communicate with each other via wireless communication channels. However, in alternate embodiments, nodes 18 may communicate with each other via a solid state communications medium such as dedicated cables, over powerlines, or optical fibres. In a further variation a combination of wireless and solid state channels may be used to provide communication between nodes 18. Moreover, the nodes 18 may utilise pre-existing communications infrastructure of the worksite to facilitate information transferred between nodes 18.

Each node 18 may be both hard-wired to a worksite power supply or grid and provided with battery backup in an event of a disconnection from the worksite power supply. Each of the nodes may also be housed with a thermal and explosion resistant housing to provide shielding in the event of a catastrophic event in the worksite.

The above nodes can be considered as smart or active nodes in that they are able to automatically re-route communications in the event of loss communications with another node and/or provided video and sensory capability.

However in addition one or more "dumb" nodes 18d can be provided. The dumb nodes are enabled to communicate with active tags in the worksite and provide corresponding position data relating to the active tag, as per a smart node. However in addition to this the dumb nodes act solely as signal relay devices and are unable to act as a router, nor have any sensing capabilities for environmental conditions, e.g. heat, smoke, gas etc. Such dumb nodes 18d may be positioned to provide one or more redundant communications paths particularly, though not exclusively in regions where the surrounding infrastructure may make electronic signal communications difficult and/or of lower than required reliability. Throughout this description the term "node 18" is used and to be understood in a generic sense to include smart or dumb nodes unless the context of use implies otherwise.

Figure 4:
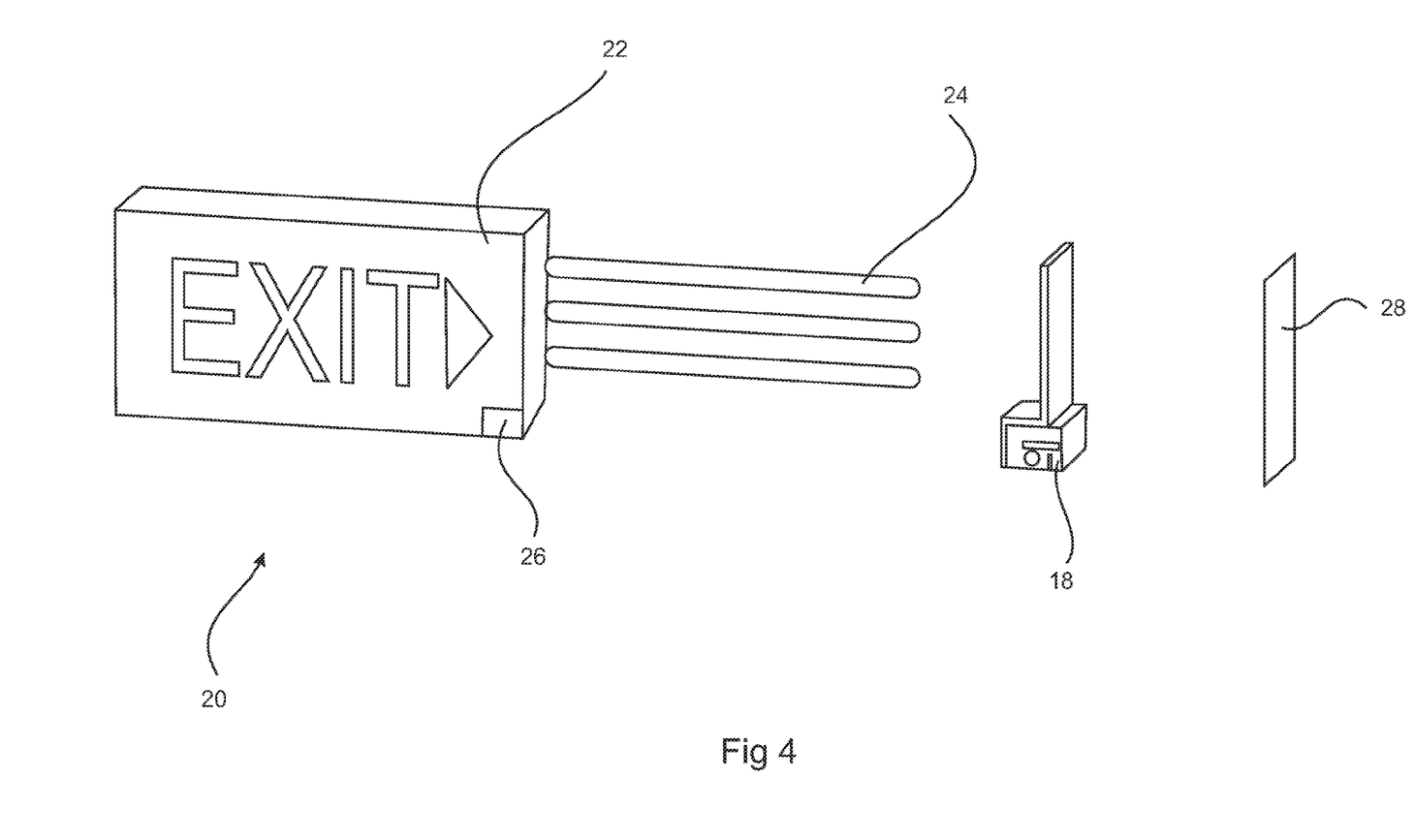
FIG. 4 is a representation of a node which forms part of the emergency services system being incorporated into an exit sign.

With reference to FIG. 4, in one embodiment a node 14 may be housed within an exit sign 20. The sign 20 comprises a housing 22 in which is disposed a plurality of illumination devices such as fluorescent light tubes 24 to provide lighting of the exit sign 20. Batteries may also be provided as a backup power supply for the lighting tubes 24. Node 14 is configured to fit within the housing 22. A small window or cut-away opening 26 is provided in a corner of the housing 22 at a position to register with one or more sensors and/or video or audio surveillance equipment which may be incorporated in the node 14. These additional features are discussed in greater detail below. The housing 22 is closed by a detachable side panel 28 which allows quick and easy access to the node 14.

Figure 5:
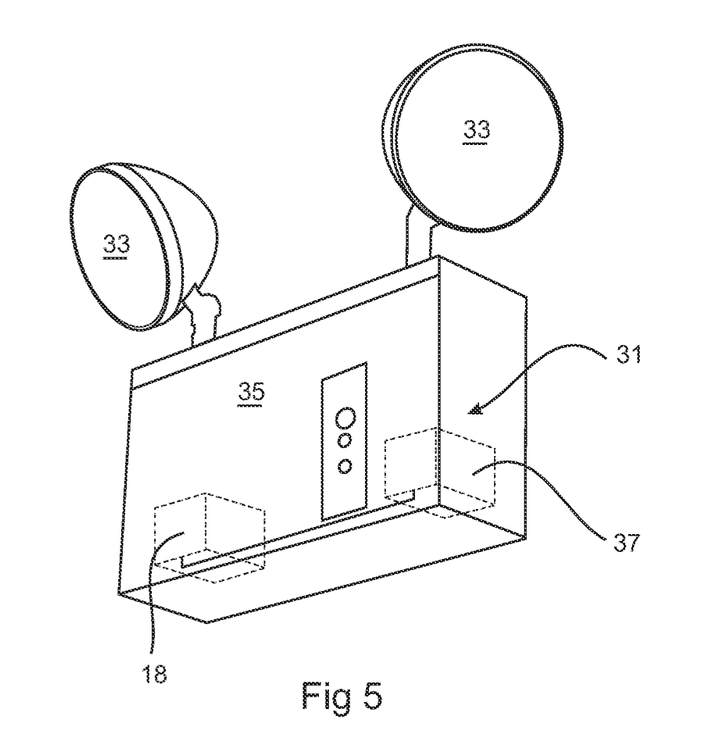
FIG. 5 is a representation of a node which forms part of the emergency services system being incorporated into an emergency lighting system.

Alternatively or additionally a node 18 may be installed or retro-fitted in a conventional emergency lighting system 31 as shown in FIG. 5. A conventional emergency lighting system usually comprises two mains powered floodlights 33 directed in opposite directions mounted on a housing 35. A battery 37 in the housing 35 provides back-up power to the lights 31 and node 18 in the event of mains power failure. Significantly however for the purposes of embodiments of the present invention emergency lighting systems are often placed in corridors intermediate exit signs. Thus installation of the EES 10 in a worksite can be simplified by using a combination of both existing exit signs and emergency lighting systems to accommodate at least some nodes 18.

Incorporating the node 18 into an existing exit sign 20 and/or emergency lighting system is believed to provide synergistic benefits due to the existence of battery backup and the inherent location of such signs 20 and lighting systems. With regard to the latter, exit signs 20 are typically distributed across a worksite at all locations where people are ordinarily present and enter or leave the worksite or designated areas within a worksite, while emergency lighting systems are typically located in corridors or thoroughfares between entry and exits points of the worksite.

As previously mentioned, nodes 18 may also incorporate a range of sensors as well as video and/or audio surveillance equipment. The sensors sense different physical characteristics in an immediately adjacent region or environment. Examples of physical characteristics sensed by the sensors include but are not limited to: air temperature, air pressure, moisture, smoke, fire, infrared radiation, vibration, motion and specific gases such as natural gas or methane. Information pertaining to the sensed characteristics is communicated via the associated node 18 and the mesh network 14 to the management system 16. The management system is programmed or otherwise configured to display the sensed data and raise alarms in the event that sensed data lies outside prescribed levels or ranges.

While it may be convenient for one or more of the sensors to be co-located with a node 18, this is not a necessity. Numerous sensors may be located at positions physically separated from a node 18 but nonetheless in communication with one or more of the nodes 18.

The provision of video and/or audio surveillance allows operators at the management system 16 to view public areas of the worksite in real time. Additionally the video and audio data can be recorded on a recording system of the ESS10. The provision of such data also facilitates better critical decision making in an emergency situations, for example: cutting off power or ventilation to various areas; operating doors or gates to partition one or more parts of the worksite from others; and, directing personnel away from dangerous areas of the worksite.

An embodiment of the method of installing the ESS 10 relies on placing the nodes 18 at locations based on observed signal strength. More particularly, in this embodiment the ESS 10 relies on use of signal strength in the mesh communication network 14 to provide one source of location information. The observed signal strength received to multiple nodes 18 is used to triangulate the position of a tag 12. As part of the installation procedure an analysis of node placement in the physical worksite is conducted. This involves observing the signal strength at different locations for all of the nodes 18 reachable at that location and calibrating the signal strengths in a database of the management system 16 against positions within a three dimensional model of the worksite. The tags 12 may be arranged to transmit signal strength information in addition, or as an alternative, to specific location information as part of their normal operation. The management system 16 then utilises information stored in the database of observed signal strength to determine location of a tag 12 and thus a person within the worksite. The location resolution provided by this is in the order of 1 meter or less.

As mentioned above, the ESS 10 may incorporate a recording system to record location of tags 12 (and thus people), video and audio data, and sensor data. Indeed duplicate recording systems or at least data storage duplicate of the recorded data may be provided at multiple separated locations. For example, a recording system may be located at the worksite itself, adjacent to the worksite and in a remote operation centre. The recorded data can be used in various scenarios including but not limited to:

1. In the event of an emergency occurring, emergency response personnel can view location or relevant information for a period of time just before the emergency occurred. This may provide important information to assist in the rescue of people in danger or to highlight the possibility of another emergency event in the near future.
2. In a catastrophic emergency scenario, significant portions of the worksite may be damaged and live information feeds from many or all of the nodes 18 may not be available. In this scenario, the recorded data leading up to the event can be extrapolated by emergency response personnel to assist in decision making. For example if a previously active tag 12 is no longer detected by the nodes 18, then review of recorded data to determine the location of a person prior to the occurrence of the emergency can greatly assist in locating them.
3. Review of recorded data after an emergency event may also be used to assist in streamlining and improving emergency response procedures.

The management system 16 may be programmed or otherwise configured to produce alarms in the event of anomalous or undesirable events being detected. For example an alarm may be triggered by the management system 16 in the event of the detection of a person on the worksite without a corresponding active tag 12. Such may occur for example by the use of motion or infrared detectors. If such a person is detected without the detection of an active tag 12 at the same location, or a difference in the number of personnel and tags is detected, the existence of a person without a tag 12 can be inferred. Also, a particular duty or function of persons with active tags 12 can be recorded by the management system 16. An alarm may be raised if a person performing a designated function or task is located in an un-authorised area of the worksite. Further, alarms may be raised where persons with potentially dangerous conflicting tasks or functions are co-located. For example, it may be undesirable to have a welder and a painter or pipe repair personnel within a prescribed distance of each other due to the potential danger of sparks from a welder igniting paint fumes or fluids leaking from a pipe. Of course other alarms may be triggered in the event that one or more sensors detect physical characteristics outside of prescribed levels or ranges. For example a sensor detecting the presence of natural gas or methane above a prescribed level can also trigger an alarm.

The ESS 10 incorporates one or more dynamically positionable nodes which can be deployed to supplement, or assist in repair of, the mesh network 14 for example in the event that one or more fixed nodes become disabled. As suggested above one or more of the dumb nodes 18d may also be used for this purpose.

Figure 6:
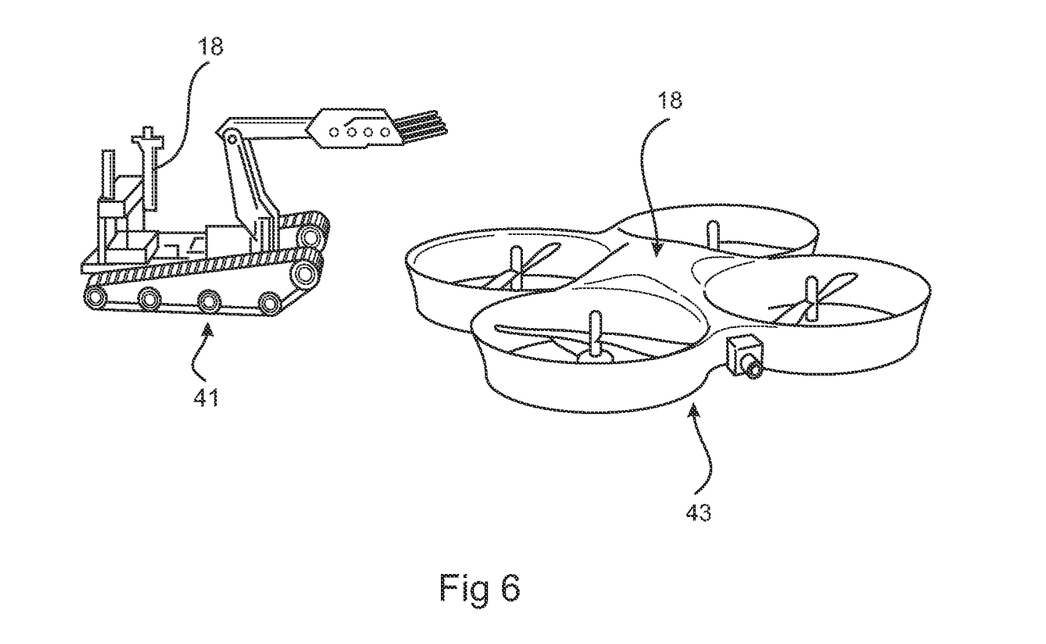
FIG. 6 represents two different forms of unmanned vehicles in or on which nodes can be supported.

The dynamically positionable nodes may be supported by a variety of unmanned node vehicles or UNVs 41, 43 as shown in FIG. 6. One example of a UNV is a remotely controlled wheeled or tracked robot 41. The robot can be moved by remote controlled to a location to communicate with one or more active nodes to reconstitute or augment the mesh network 14. A further example of a UNV is a remote controlled flying vehicle such as a quad copter 43. Quad copters 43 are known as being very stable remotely controlled airborne vehicles which can be manoeuvred into and through tight passages.

One or more of the nodes may also be installed in escape vehicles associated with the worksite. For example, FIG. 2 illustrates, in a transparent or x-ray mode a worksite in the form an offshore oil rig. The rig contains a number of escape pods or vessels 40. The communications network 14 includes a node 18 in each of the vessels 40. The nodes in the vessels 40 are ordinarily active and communicate with the management system 16 via the associated communications network 14. In a case of an emergency where people are being evacuated in one of the vessels 40, the node 18 in that vessel continues to communicate either via the communications network 14 with management system 16; or directly to the management system 16. Consequently the identification of people wearing active tags within the vessel 40 can be viewed via the management system 16 and logged on the recording system.

Now that an embodiment of the present invention has been described in detail it will be apparent to those skilled in the relevant arts that numerous modifications and variations may be made without departing from the basic inventive concepts. For example, the system 10 is not limited to use on an oil rig and may be used in any other worksite. Further, the specific technology used for communication between nodes 18 or more broadly throughout the mesh network 14 is not critical and may comprise a mixture of known communication technologies and protocols. Further, the ESS 10 may be incorporated in a control system for the worksite where the data input and visualised in the management system can be used to provide feedback on the operational status of the worksite. This in turn can enable operators of the control centre to exert control over equipment in the worksite. Further the ESS 10 may incorporate multiple management systems 16, a first being on the worksite with one or more duplicate management systems located remote from the first management system. It is envisaged that the at least one of the duplicate sites is not only remote from the first management system but moreover remote from the worksite. This provides redundancy in the event of a catastrophic event which disables a first (onsite) management system. When a duplicate management system is provided the first management system and the mesh network are arranged to independently communicate with the duplicate management system to enable operators at the duplicate system to continue to monitor the worksite.

In yet a further variation each tag 12 can be provided with an integrated GPS device and the management system is arranged to track the tags 12 using the GPS directly to provide a secondary mechanism for tracking people with active tags. As the management system 16 directly tracks the tags 12 via the corresponding GPS device, tracking information is available to operators at the management system(s) in the event that position information/data is not communicated via the mesh network. Circumstances when this may occur include a person falling off an offshore rig and moving outside the communication range of the mesh network, or a catastrophic event occurs of such a scale to totally disable the mesh network and/or the on site management system. In the latter case GPS tracking is available at duplicate remote management systems.

All such modifications and variations are deemed to be within the scope of the present invention the nature of which is to be determined from the above description and the appended claims.

The claims defining the invention are as follows:

1. An emergency services system for a worksite comprising:
   a mesh communications network comprising a plurality of communication nodes distributed to enable communication over the worksite;
   a plurality of personal tags, each personal tag configured to be carried by or on a person, the tags being switchable between: an active state in which the tag is recognised by one or more of the nodes and uniquely identifies a person carrying the tag; and, an inactive state where the tag is not recognised by one or more of the nodes;
   the nodes enabled to communicate with active tags in the worksite and provide corresponding position data relating to the active tags;
   a management system configured to receive and process the position data of the active tags from one or more of the nodes via the mesh communications network, and comprising a three dimensional representation of the worksite enabled to provide real time indication of the location of each active tag and the location of each node within a prescribed distance of one meter or less; and
   the emergency services system is configured to detect presence of a person in the worksite without an active tag and, upon detection of such a person, raise an alarm.

2. The emergency services system according to claim 1 comprising one or more sensors capable of sensing physical characteristics in respective adjacent regions of the worksite, the sensors providing sensor data which is communicated by the mesh communications network to the management system.

3. The emergency services system according to claim 2 wherein the one or more sensors comprises one or more of: an air temperature sensor, an air pressure sensor, a gas sensor, a moisture sensor, a smoke sensor, a fire sensor, a motion sensor, and an infrared sensor.

4. The emergency services system according to claim 2 wherein one or more of the sensors are incorporated in or integrated with one or more of the nodes.

5. The emergency services system according to claim 1 wherein the management system is arranged to do one or more of: (a) correlate a tag with authorised and unauthorised areas of the worksite, and issue an alarm in the event that an active tag is detected in an unauthorised area; or (b) correlate an active tag with a task or function of a person carrying the active tag; or (c) issue an alarm in the event of a loss of one or both of (i) communication with a node in the network; and (ii) communication between an active tag and a node.

6. The emergency services system according to claim 5 wherein the management system is arranged to raise an alarm in the event that active tags for two or more people with incompatible tasks or function are located within a prescribed separation distance.

7. The emergency services system according to claim 1 wherein one or more of the nodes is provided in an emergency escape vehicle of the worksite, the or each node in the emergency escape vehicle being configured to communicate with the management system either: via the mesh network; or, directly upon deployment of the vehicle.

8. The emergency services system according to claim 1 wherein the mesh network comprises one or more dynamically positionable nodes capable of being positioned at a location in the worksite to supplement the mesh network.

9. The emergency services system according to claim 8 wherein at least one of the dynamically positionable nodes is supported on either a remote controlled robot or a remotely controlled flying machine.

10. The emergency services system according to claim 1 wherein the mesh network (a) comprises a wireless communication network; or (b) is provided over power lines of the worksite; or (c) comprises a combination of wireless and wired communications channels.

11. The emergency services system according to claim 1 further comprising a recording system enabled to record: location data of active tags within one meter or less; people detected by the network without an active tag; and data detected by the sensors.

12. The emergency services system according to claim 1 wherein the management system is enabled to provide historical data pertaining to a last known location of a person prior to a user specified point in time.

13. The emergency services system according to claim 1 wherein each tags is in the form of a portable electronic device configurable to uniquely identify a person associated with the device.

14. The emergency services system according to claim 1 wherein at least one of the tags is configured to be carried in a pocket of clothing of the person, or a clip on tag, or a pouch attachable to a belt or item of clothing of the person.

15. The emergency services system according to claim 1 wherein at least one of the tags is embedded in or carried by a safety helmet or shoe.

16. The emergency services system according to claim 1 wherein one or more of the nodes is provided with either one or both of video surveillance equipment and audio surveillance equipment and arranged to communicate corresponding video and audio data via the mesh network to the management system.

17. The emergency services system according to claim 1 wherein the system is configured to determine location data of an activated tag on the basis of received wireless signal strength between that tag and a plurality of nodes.

18. The emergency services system according to claim 1 comprising a biometric recognition system integrated with the management system and the tags to uniquely identify a person provided with an active tag.

19. The emergency services system according to claim 1 comprising at least one duplicate management systems located remote from the management system and wherein the management system and the mesh network are each arranged to independently communicate the position data and sensor data to each of the at least one duplicate management system.

20. The emergency services system according to claim 1 wherein the tags are arranged to communicate life signs of the person identified by a corresponding tag to the management system.

21. The emergency services system according to claim 20 wherein the life signs comprise one or more of: pulse rate, heartbeat, and electrocardiogram signal.

22. A method of providing an emergency services system in a worksite comprising:
providing one or more people in the worksite with a respective tag, wherein each tag when activated uniquely identifies a corresponding single person;
detecting the location of tags in the worksite to a resolution of about one meter or less and communicating the location via a mesh communications network that facilities electronic communications on the worksite to a management system;
using the management system to monitor the location and movement of people in the worksite;
correlating an active tag with a task or function of a person carrying the active tag; and
raising an alarm in the event that active tags for two or more people with incompatible tasks or function are located within a prescribed separation distance.

23. The method according to claim 22 comprising using existing infrastructure of the worksite to at least partially establish the mesh communication network.

24. The method according to claim 23 wherein establishing the mesh communication network comprises providing a plurality re-configurable communication nodes arranged to communicate with each other and the tags, and facilitate communications between the tags and the management system.

25. The method according to claim 23 wherein using existing infrastructure comprising installing one or more nodes of the mesh communication network in respective either exit signs of the worksite or emergency lighting system of the worksite or both exit signs and emergency lighting system of the worksite.

26. The method according to claim 22 wherein detecting the location of tags in the worksite comprises one or both of (a) using signal strength measurements between a tag and a plurality of nodes in the communications system and (b) communicating GPS data from a tag directly to the management system.

27. The method according to claim 22 comprising correlating a tag with authorised and unauthorised areas of the worksite, and raising an alarm in the event that an active tag is detected in an unauthorised area.

28. The method according to claim 22 comprising providing sensors for sensing physical characteristics at one or more locations in the worksite and communicating sensed physical characteristics via the mesh communication network to the management system.

29. The method according to claim 28 comprising providing the sensors to sense one or more of the following physical characteristics: air temperature, air pressure, the presence of one or more target gases, moisture, smoke, fire, motion, and infrared radiation.

30. An emergency services system for a worksite comprising:
   a mesh communications network comprising a plurality of communication nodes distributed to enable communication over the worksite;
   a plurality of personal tags, each personal tag configured to be carried by or on a person, the tags being switchable between: an active state in which the tag is recognised by one or more of the nodes and uniquely identifies a person carrying the tag; and, an inactive state where the tag is not recognized by one or more of the nodes;
   the nodes enabled to communicate with active tags in the worksite and provide corresponding position data relating to the active tags;
   a management system configured to receive and process the position data of the active tags from one or more of the nodes via the mesh communications network, and comprising a three dimensional representation of the worksite enabled to provide real time indication of the location of each active tag and each node within a prescribed distance of one meter or less, the management system being arranged to correlate an active tag with a task or function of a person carrying the active tag and to raise an alarm in the event that active tags for two or more people with incompatible tasks or function are located within a prescribed separation distance.

31. The emergency services system according to claim 30 wherein one or more of the nodes comprise or is integrated with a respective exit sign or an emergency lighting system of the worksite.

32. An emergency services system for a worksite comprising:
   a mesh communications network comprising a plurality of communication nodes distributed to enable communication over the worksite wherein one or more of the nodes are capable of being dynamically positioned at locations in the worksite to supplement the mesh network, and wherein at least one of the dynamically positionable nodes is supported on (a) a remote controlled robot, or (b) a remotely controlled flying machine;
   a plurality of personal tags, each personal tag configured to be carried by or on a person, the tags being switchable between: an active state in which the tag is recognised by one or more of the nodes and uniquely identifies a person carrying the tag; and, an inactive state where the tag is not recognized by one or more of the nodes;
   the nodes enabled to communicate with active tags in the worksite and provide corresponding position data relating to the active tags;
   a management system configured to receive and process the position data of the active tags from one or more of the nodes via the mesh communications network, and comprising a three dimensional representation of the worksite enabled to provide real time indication of the location of each active tag and each node within a prescribed distance of one meter or less.

33. An emergency services system for a worksite comprising:
   a mesh communications network comprising a plurality of communication nodes distributed to enable communication over the worksite;
   a plurality of personal tags, each personal tag configured to be carried by or on a person, the tags being switchable between: an active state in which the tag is recognised by one or more of the nodes and uniquely identifies a person carrying the tag; and, an inactive state where the tag is not recognized by one or more of the nodes;
   the nodes enabled to communicate with active tags in the worksite and provide corresponding position data relating to the active tags;
   a management system configured to receive and process the position data of the active tags from one or more of the nodes via the mesh communications network, and comprising a three dimensional representation of the worksite enabled to provide real time indication of the location of each active tag and each node within a prescribed distance of one meter or less; and
   a recording system enabled to record: location data of active tags within one meter or less; people detected by the network without an active tag; and data detected by the sensors.

34. An emergency services system for a worksite comprising:
   a mesh communications network comprising a plurality of communication nodes distributed to enable communication over the worksite;
   a plurality of personal tags, each personal tag configured to be carried by or on a person, the tags being switchable between: an active state in which the tag is recognised by one or more of the nodes and uniquely identifies a person carrying the tag; and, an inactive state where the tag is not recognized by one or more of the nodes;
   the nodes enabled to communicate with active tags in the worksite and provide corresponding position data relating to the active tags;
   a management system configured to receive and process the position data of the active tags from one or more of the nodes via the mesh communications network, and comprising a three dimensional representation of the worksite enabled to provide real time indication of the location of each active tag and each node within a prescribed distance of one meter or less; and
   at least one duplicate management systems located remote from the management system and wherein the management system and the mesh network are each arranged to independently communicate the position data and sensor data to each of the at least one duplicate management system.

35. An emergency services system for a worksite comprising:
   a mesh communications network comprising a plurality of communication nodes distributed to enable communication over the worksite;
   a plurality of personal tags, each personal tag configured to be carried by or on a person, the tags being switchable between: an active state in which the tag is recognised by one or more of the nodes and uniquely identifies a person carrying the tag; and, an inactive state where the tag is not recognised by one of the nodes;

the nodes enabled to communicate with active tags in the worksite and provide corresponding position data relating to the active tags; and a management system configured to receive and process the position data of the active tags from one or more of the nodes via the mesh communications network, and comprising a three dimensional representation of the worksite enabled to provide real time indication of the location of each active tag and each node;

the management system being further configured to be calibrated by storing in a database a series of tag signal strengths received by the nodes, which tag signal strengths are associated with specific positions within the worksite, and wherein the management system is configured to compare the tag's signal strength with the database to determine the location of the tag within the worksite to a resolution of one meter or less.

* * * * *

UNITED STATES PATENT AND TRADEMARK OFFICE
CERTIFICATE OF CORRECTION

PATENT NO. : 9,466,197 B2  
APPLICATION NO. : 14/200912  
DATED : October 11, 2016  
INVENTOR(S) : Margaret Hildick-Pytte

Page 1 of 1

It is certified that error appears in the above-identified patent and that said Letters Patent is hereby corrected as shown below:

In the Claims

At Column 12, Line 36 (Claim 22, Line 9), please replace "facilities" with --facilitates--.

Signed and Sealed this
Twenty-fifth Day of April, 2017

Michelle K. Lee
*Director of the United States Patent and Trademark Office*